United States Patent Office 3,345,882
Patented Oct. 10, 1967

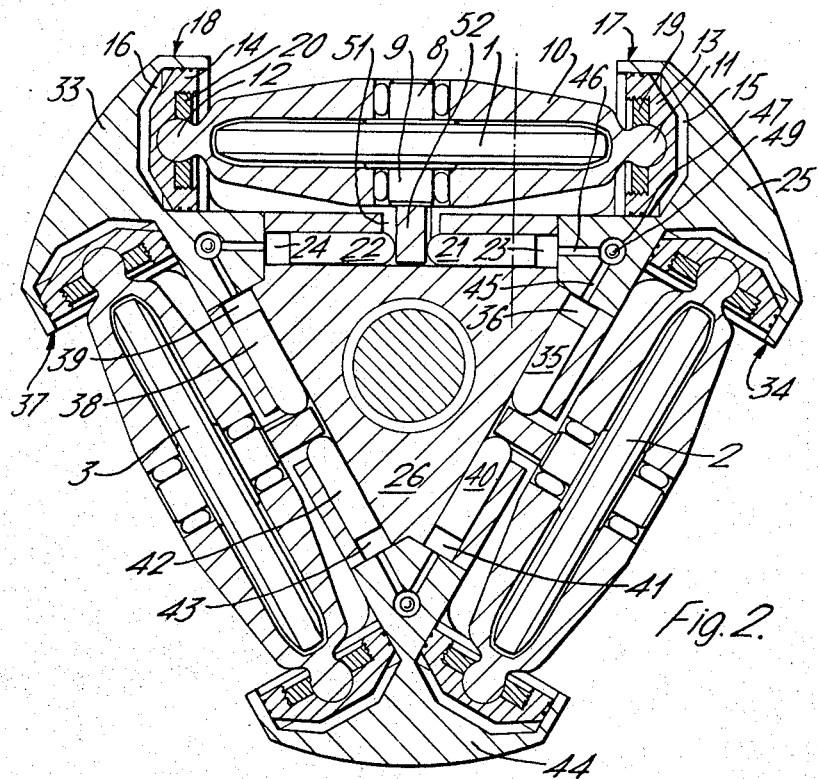
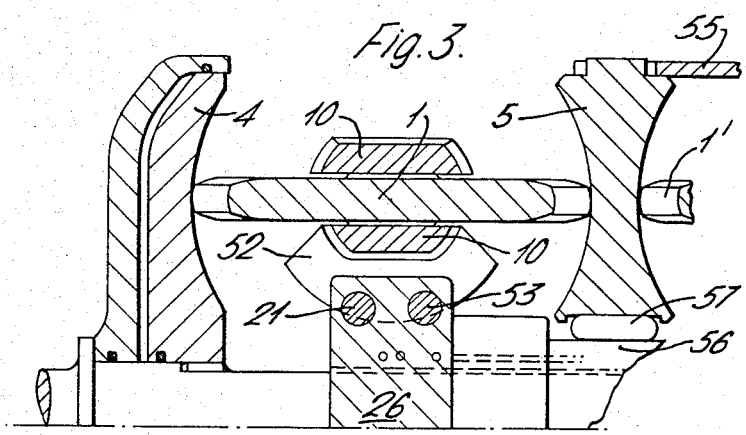

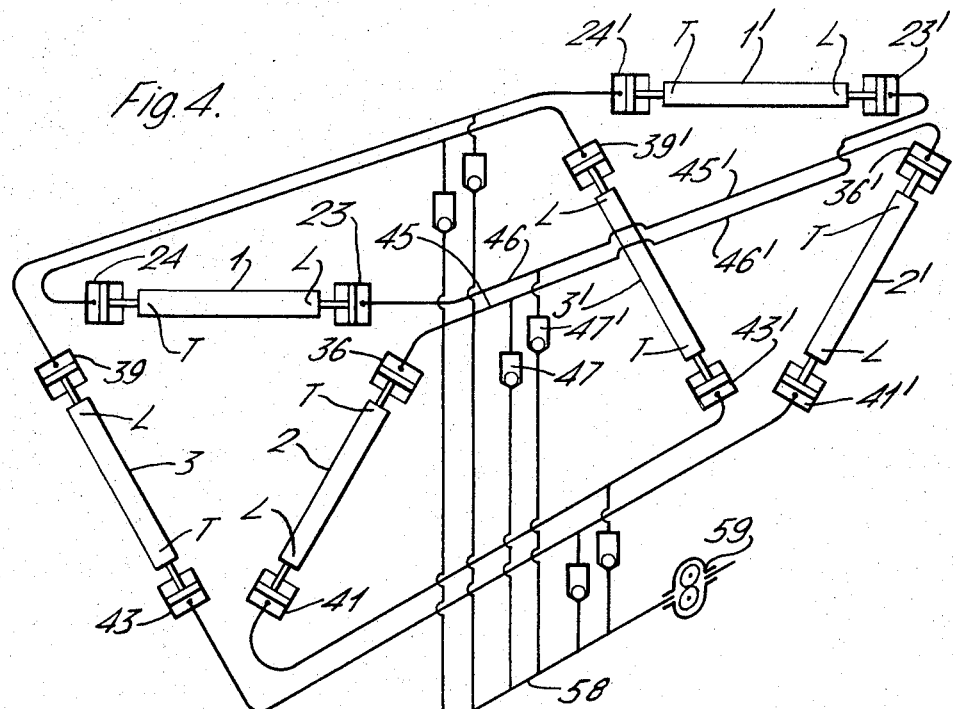
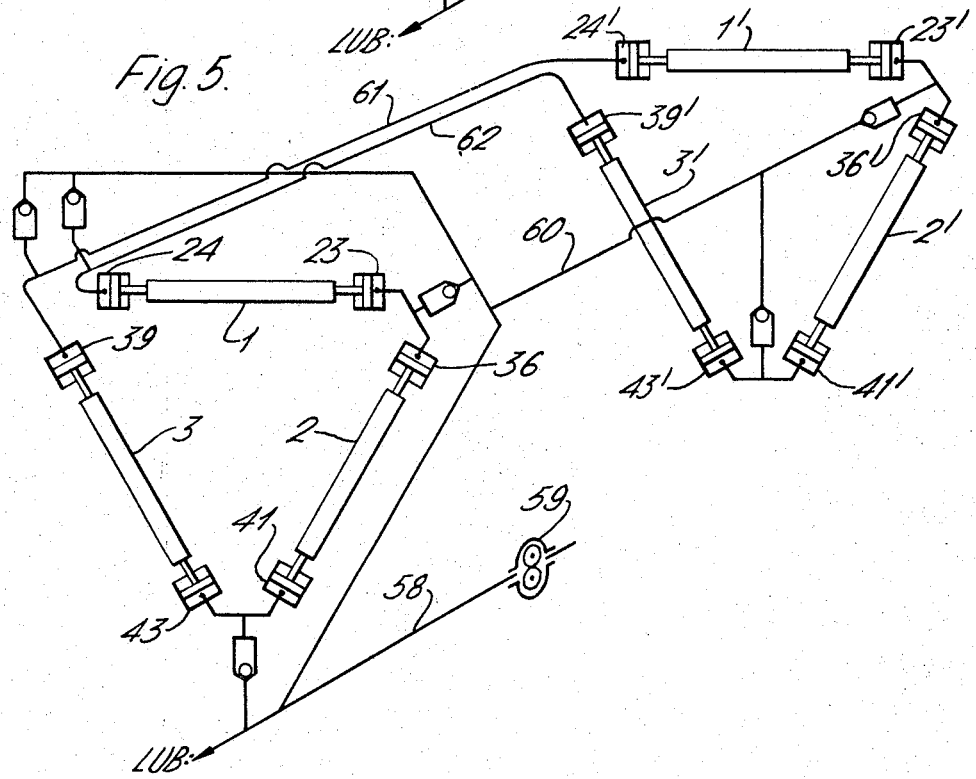

3,345,882
TORIC RACE TRANSMISSION UNITS
John Noel Armstrong, Caterham, England, assignor to
National Research Development Corporation, London,
England, a British corporation
Filed Apr. 28, 1965, Ser. No. 451,421
Claims priority, application Great Britain, May 1, 1964,
18,306/64
10 Claims. (Cl. 74—200)

ABSTRACT OF THE DISCLOSURE

A toroidal race rolling friction transmission unit in which ratio changes are initiated by bodily lateral translation of the roller mountings tangentially of the center circle of the torus, under control of hydraulic actuators individual to the rollers and whereby the rollers can undertake this type of translation individually in response to unequal torque loads to initiate differential ratio changes so that the transmission load is shared equally between the rollers automatically.

Figure 1:
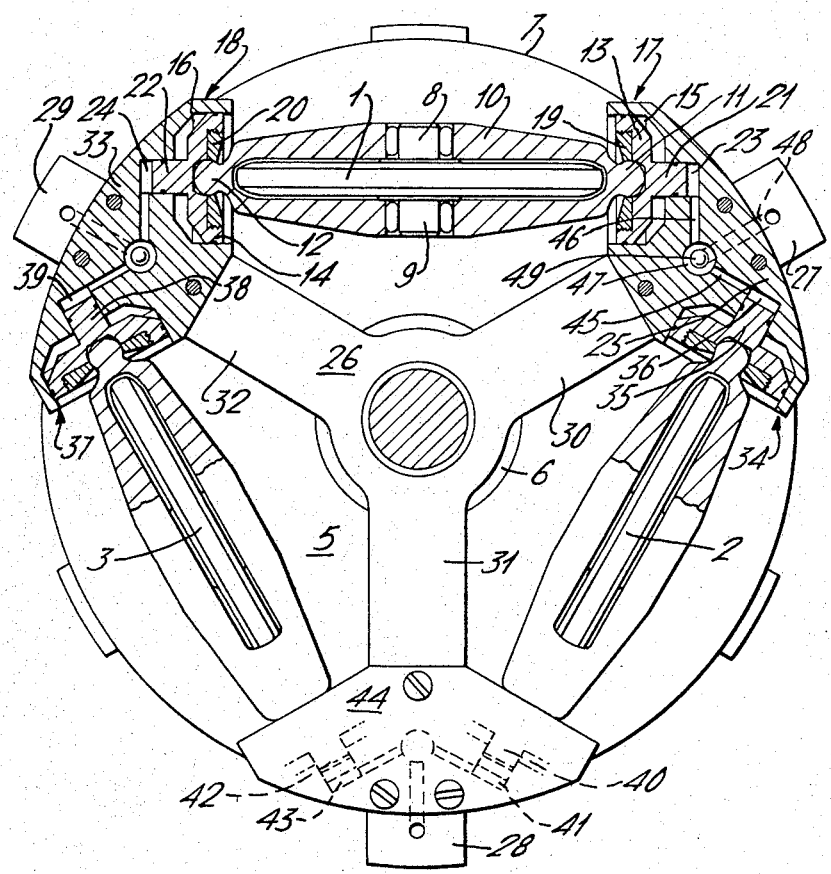

It is desirable to damp these differential roller motions without damping also motions made in unison by the rollers in the coarse of ratio changes by the transmission unit as a whole.

Each roller mounting has a leading and a trailing dashpot and the dashpots are connected together in pairs, the leading dashpot for one roller with a trailing dashpot for another roller. When the mountings of two rollers undergo lateral translation in unison in the same sense and degree one dashpot of the pair common to these two rollers expands and the other contracts so that the combined dashpot volume is unaltered. When, for load equalization, the roller mountings make differential lateral translation motions (that is, which are not the same in sense and degree) then the combined dashpot volume changes and fluid is forced through a restrictor orifice. Single-acting dashpots may be used, topped up from a low pressure fluid circuit through non-return valves which close when the combined dashpot volume diminishes.

A double-sided transmission unit having two sets of rollers, each set interconnecting a pair of toroidal disc surfaces, corresponding surfaces of the disc pairs being fixed to rotate together. A pair of dashpots may have the dashpot for only one roller of one set paired with a dashpot for the roller of another set, other pairings being confined to rollers of the same set, and still maintain a sequence of interconnected dashpots embracing all the rollers.

---

This invention relates to variable ratio transmission units of the so-called "rolling friction" type having input and output discs mounted for rotation about a common main axis and having facing toroidal surfaces between which tiltable rollers provide a driving connection.

The invention has particular relevance to transmission units of the said type in which the rollers are mounted with freedom of movement of a first character permitting the diameters of the discs with which the rollers make driving contact to be varied so as to vary the transmission ratio of the transmission unit and with freedom of motion also of a second character whereby the rotational axes of the rollers depart from the stable equilibrium attitude where the said roller axes intersect the main axis so that the rollers steer themselves from one ratio attitude to another ratio attitude.

It is known for the roller mountings to be arranged so that the driving torque reaction of each roller is resisted by a fluid pressure actuator individual to that roller, the actuators being supplied with fluid under pressure from a common source, the pressure being varied to cause the rollers to undergo motions of the second character and bring about a change of ratio for the transmission unit.

If the actuators all have the same effective "piston area" the rollers will automatically adjust their ratio angles individually so that all the rollers are subjected to equal torque reactions whereby the driving load is shared equally between the rollers. If the torque reaction at a roller exceeds the resisting force of the actuator, the roller will undergo a motion of the second character causing it to steer itself to a lower ratio attitude in the course of which it will be progressively relieved of its torque reaction load until the latter reaches equality with the force from the actuator whereup the roller will resume the equilibrium attitude in which its rotational axis intersects the main axis.

Whilst this is in general a stable arrangement, there are certain circumstances in which the rollers may oscillate about their equilibrium attitudes and as one roller oscilating individually in this way is subject to a fluctuating torque reaction, corresponding torque reaction fluctuations are applied to the other rollers in opposite sense so that the other rollers also start to oscillate out of phase with the first roller and out of phase with one another since the rollers are unlikely to have identical response times to torque fluctuations in a transmission constructed to normal engineering limits of accuracy.

It has been proposed to overcome this difficulty by the application of viscous damping to the individual motions, of the rollers, of the second character. This is not entirely satisfactory however, since this form of damping damps the response of the rollers to changes in the torque transmitted by the transmission unit. This is a grave disadvantage in installations where the control of ratio is brought about by means of a servo system which varies the pressure applied to the roller actuators according to an adjustable performance criterion. It is a feature of such systems that the pressure changes promptly in response to a sudden change of torque, by virtue of a momentary change of ratio which feeds back through the servo system to vary the control pressure. If the rollers are damped so that their motions of the second character are delayed the ratio of the transmission unit is not sensitive to fluctuations of torque and the control pressure does not rise and fall promptly in response to changes of torque. It is frequently desired to utilise the servo control pressure to control subsidiary functions of the system such as a clutch or a fluid pressure operated actuator applying the end load to the discs to force them into driving engagement with the rollers. A sudden increase of torque not promptly followed by a corresponding increase of control pressure could cause the clutch to slip or the rollers to slip on the discs, in the instances quoted above.

According to the invention viscous damping is applied to motions of the second character on the part of the rollers, such damping being ineffective when all the rollers undertake such motion together in unison to initiate a change of ratio.

In a preferred form of the invention dashpot means (hereinafter called a "leading dashpot") are provided for a roller, adapted to reduce the capacity of a fluid-filled chamber when the roller executes a motion of the second character of a sense such as to initiate a change of ratio towards a lower ratio and dashpot means (hereinafter called a "trailing dashpot") are provided for another roller adapted to reduce the capacity of a fluid filled chamber when that other roller executes a motion of the second character of a sense such as to initiate a change of ratio towards a higher ratio, an interconnection between the chambers and at least one restrictive passage through which fluid is caused to flow when one of the chambers is reduced in capacity without a corresponding increase in capacity on the part of the other chamber.

The chamber of a leading dashpot increases in capacity when the associated roller executes a motion of the second character of a sense such as to initiate a change of ratio towards a high ratio and the chamber of a trailing dashpot increases in capacity when the associated roller executes a motion of the second character of a sense such as to initiate a change of ratio towards a lower ratio.

In order that the dashpots shall be constantly primed with fluid it is preferable to provide for a continuous flow of fluid from a source of fluid under pressure, into the interconnected dashpot chambers and out through the resistive passage and conveniently each dashpot may be single acting, a non return valve being inserted in the path by which fluid enters the dashpot chamber from the pressurized fluid source to cut off backward flow from the chamber to the source when fluid is displaced from the chamber in the absence of a corresponding increase in the capacity of the chamber, associated with another roller, to which it is interconnected, the valve opening to enable the chamber to be quickly replenished when one of the said chambers increases in capacity, in the absence of a corresponding decrease in the capacity of the other chamber with which it is interconnected.

When the two rollers make motions of the second character in equal degree and in the same sense the reduction in the capacity of one of the dashpot chambers does not displace fluid through the resistive passage because fluid flows through the interconnection into the expanding capacity of the other chamber. Only when the rollers execute motions of the second character which are opposite in sense or different in degree is there a change of the combined capacity of the two chambers, leading to the forcing of fluid through the resistive passage and, as indicated above, the dashpots may be single acting dashpots providing damping only when there is a reduction in the total capacity of the interconnected pair of dashpot chambers.

Where the proneness to oscillation on the part of the rollers is slight it may be possible to control it by means of only one single-acting leading dashpot for one roller interconnected with only one single-acting trailing dashpot for another roller since this will damp each half cycle of oscillation and prevent the build-up of substantial amplitudes. The same arrangement applied to two rollers only of a transmission unit having more than two rollers will provide a certain degree of oscillation control because the sequence of oscillatory circulation around the rollers will be arrested at one point in every complete cycle.

It is preferable however to provide a leading dashpot and a trailing dashpot for each roller, the leading dashpot of one roller being connected to the trailing dashpot of another roller in pairs so that when one dashpot pair is increasing its total chamber capacity and being replenished with fluid another dashpot pair is reducing its total capacity and supplying damping by forcing fluid to flow through the resistive passage.

The invention will be more readily understood from the following description of certain embodiments thereof, illustrated in the accompanying drawings in which:

FIGURE 1 is a transverse section of the roller support means for a first embodiment of the invention, FIGURE 2 is a transverse section of the roller support means for a second embodiment of the invention, FIGURE 3 is a section in a plane parallel to the main axis of part of the second embodiment, FIGURE 4 is a schematic diagram of the method of interconnection of dashpots in a third embodiment of the invention, and FIGURE 5 is a schematic diagram of an alternative method of interconnection of dashpots.

In FIGURE 1, three rollers, 1, 2 and 3 provide driving connections between a disc 4 which has been removed to reveal the rollers and their support means, and a disc 5 indicated by its inner margin 6 and its outer margin 7.

The rollers are all supported in a similar way so that it is only necessary to describe the mounting for roller 1 in detail.

Roller 1 has integral axle pins 8 and 9 which are carried by means of needle rollers in a roller carrier 10.

Roller carrier 10 has ball ends 11 and 12 which are nested in part-spherical seatings in pistons 13 and 14. These pistons cooperate with cylinders 15 and 16 to form hydraulic actuators generally designated 17 and 18.

When the pressures in actuators 17 and 18 are adjusted so that the difference between the forces applied by the two actuators is less than the torque reaction experienced by the roller, the roller and its carrier will move bodily in a direction tangential to the torus centre circle. This movement, which constitutes the said motion of the second character, moves the roller rotational axis to one side of the main axis and the motion, in the case where the torque reaction is greater than the difference between the actuator forces, is of a sense such that the roller steers itself into a lower ratio attitude.

Conversely when the actuator force difference acting to oppose the torque reaction, is greater than the torque reaction, a motion of the second character of the opposite sense takes place and the roller steers itself to a higher ratio attitude.

The terms "high" and "low" are used in relation to "ratio" in the sense in which they are commonly used in connection with a vehicle transmission system when one speaks of "high" gear, meaning a high ratio of output speed:input speed and "low" gear, meaning a low ratio of output speed:input speed.

The manner whereby a change of ratio on the part of a roller is arrested, when the required ratio has been reached, will be explained below.

The line joining the centres of ball ends 11 and 12 constitutes the axis (hereinafter called the "ratio change axis"), about which the roller and its carrier rotate in the course of changing ratio and this rotation is the movement of the first character previously referred to. This axis, in the embodiment described, is inclined with respect to the plane containing the circle (hereinafter called the "torus centre circle") forming the locus of the centre of the circle which is the generator of the torus of which the working surfaces of the discs form parts. The inclination of the ratio change axis with respect to the torus centre circle plane is in the plane tangential to the torus centre circle at the roller centre and is hereinafter called "camber angle."

The existence of a camber angle provides a component of motion in the plane of the torus centre circle, on the part of the rotational axis of the roller, when it rotates about the ratio change axis. The sense of the camber angle is such that the rotational axis of the roller moves back into equilibrium position in which it intersects the main axis as the roller steers to a changed ratio attitude in consequence of a motion of the second character. Any particular position attained by the roller in the course of a motion of the second character will result in the roller achieving equilibrium at a particular ratio characteristic of that position. Where there is no camber angle a roller displaced from equilibrium by a motion of the second character will continue changing ratio until the motion of the second character is reversed to bring the roller again to a single central equilibrium position. It is usual to arrange a servo feed back loop, external to the transmission unit proper, for controlling the ratio and where no camber angle is provided this servo system can be arranged to "zero" the rollers in response to any convenient "task accomplished" signal.

The torque reaction, in the normal driving direction of the transmission unit, may be considered as acting upon roller 1 to force it to the right and this is resisted by actuator 17, which is supplied with fluid under pressure from a source of control pressure capable of variation to change the ratio of the transmission unit. The ducting for fluid supply to the actuators is omitted from the drawing for the sake of simplicity.

In the event of the driven load over-running the prime mover the direction of the torque reaction is reversed so as to drive roller 1 to the left and this is resisted by actuator 18. Where there is no possibility of this happening, for instance where a unidirectional clutch or free wheel device is included in the transmission path, actuator 18 may be replaced by a simple guide for ball end 12.

Movement of the roller and its carrier bodily in the plane of the torus centre circle in the direction of the tangent at the roller centre to the torus centre circle constitutes the motion of the second character hereinbefore referred to. As the roller is confined by contact with two disc surfaces, the roller centre must always remain in the plane of the torus centre circle. It follows therefore that the two ends of the roller carrier must move in planes parallel to the plane of the torus centre circle in a fixed camber angle arrangement. Where the camber angle is not zero the two planes in which the roller carrier ends move are displaced axially of the main axis on either side of the plane of the torus centre circle and this explains the need for the ball ends 11 and 12. The ratio change axis is inclined to the axes of the two actuators 17 and 18. An alternative solution would be to make the pistons 13 and 14 integral with the roller carrier and to make their outer edges, which engage the walls of cylinders 15 and 16, of part spherical form but this introduces sealing difficulties and the arrangement illustrated in FIG. 1 is to be preferred. Where the camber angle is zero—no camber angle in fact—the pistons 13 and 14 can be integral with roller carrier 10 and can have cylindrical outer edges with normal sealing arrangements.

Ball ends 11 and 12 are retained in pistons 13 and 14 by means of locking rings 19 and 20 which are slit along a radius so that they can be sprung over the ball ends. In their unstrained state they mate with screw threads in recesses in pistons 13 and 14 so that they cannot open out to release ball ends 11 and 12 when they are screwed home.

The pistons 13 and 14 have plungers 21 and 22 extending from their ends remote from the roller carrier 10 and these extensions are housed in sealing relation in bores 23 and 24.

Cylinder 15 and bore 23 are formed in a block of metal 25 and secured to a three armed spider member 26 which is secured to the casing of the transmission unit in any convenient manner, for instance by means of the lugs 27, 28 and 29 which are at the outer ends of the three legs 30, 31 and 32 of spider member 26.

Cylinder 16 and bore 24 are similarly formed in a block 33 secured to spider leg 32.

Block 25 also houses the trailing actuator 34 of roller 2 and this actuator has a plunger 35 attached to its piston and housed in a bore 36 in block 25, this assembly being a replica of actuator 18 and plunger/bore assembly 22/24, at the trailing end of roller 1.

Block 33 also houses the leading actuator 37 of roller 3 and also a plunger 38 within a bore 39, this actuator and plunger/bore assembly being a replica of actuator 17 and plunger/bore 21/23 of roller 1.

Plunger/bore assemblies 40/41 and 42/43 for the leading end roller 2 and the trailing end of roller 3, respectively are housed in a third block 44, secured to spider leg 31.

These plunger/bore assemblies will hereinafter be referred to as "dashpots," using the reference numerals of the respective bores.

Dashpots 23 and 36 are connected by ducts 45 and 46 to a chamber 47 which is supplied with lubricating oil from the lubricant pressure line of the transmission unit. This oil is supplied through a duct 48 (shown dotted) and a non-return valve indicated by a ball 49 in chamber 47.

A high resistance leak path, not shown in the drawing but designated 50, communicates with chamber 47.

Similar arrangements are provided for dashpot pairs 41, 43 and 24, 39 in blocks 44 and 33 so that the operation of dashpot pair 23, 36 only need be described in detail.

If rollers 1 and 2 execute motions of the second character in unison, preparatory to a change of ratio of the transmission unit as a whole a change in the volume of dashpot 23 is accompanied by a change in volume in the opposite sense of dashpot 36 and oil is displaced without any substantial hindrance through the passages 45 and 46 and chamber 47 which interconnects them.

If however roller 10 executes a motion of the second character, towards the right, independently of roller 2, there is a reduction of the combined volume of dashpots 23 and 36 and oil is compressed in chamber 47 closing ball valves 49. This oil can escape slowly through leak 50 so that the motion of roller 1 will be damped but will nevertheless take place eventually if it is required for the purposes of load equalisation between the rollers. Any oscillatory motion of the second character on the part of roller 1 is damped however.

Dashpot pair 23, 36 is only single-acting and so will only damp motions to the right of roller 1 and upward-and-rightward motions of roller 2.

If roller 1 executes a motion of the second character towards the left then it is damped in a similar way by dashpot pair 24, 39.

It will be apparent that any motion of the second character on the part of any roller in any direction, which is not accompanied by a corresponding motion of another roller, damped by one of the three dashpot pairs, whereas movements of the rollers in unison to initiate a ratio change on the part of the transmission unit as a whole are not impeded.

FIG. 2 shows an arrangement similar in many respects to that of FIG. 1 and the same reference numerals denote corresponding items in both figures. The positions of the dashpots have been changed, however, so that they are not arranged in line with the roller-positioning actuators (such as 17, 18) but are housed in a central triangular member corresponding to spider member 26 and carrying the same reference numeral.

Dashpots 23 and 24 are in line and their pistons 21 and 22 extend inwardly towards the sides of a gap 51 in member 26 and rounded ends of the pistons project into gap 51 to engage an arcuate vane 52 attached to roller carrier 10 extending therefrom inwardly towards the main axis into gap 51 which is wide enough to permit roller 1 to move between its extreme limits of motion of the second character without vane 52 fouling the sides of gap 51. Vane 52 is oriented in relation to roller carrier 10 so that its median plane (to which its dashpot piston engaging surfaces are parallel) contains the rotational axis of the roller and is normal to the ratio change axis. This orientation is not critical however.

Adjacent leading and trailing dashpots of adjacent rollers are interconnected in pairs supplied with oil through a non-return valve in the same manner as previously described in relation to FIG. 1 and the mode of operation is the same.

The arrangements above described are appropriate to a transmission unit where a single set of rollers provides a driving connection between a single pair of facing toroidal disc surfaces. In a well known alternative arrangement two sets of rollers and two pairs of toroidal disc surfaces are provided; two outer discs each have a toroidal surface facing the other and between them, along the main axis, there is a centre disc with a toroidal surface on each side of it. One of the centre disc surfaces is connected through one set of rollers to one of the outer disc surfaces and the other centre disc surface is connected through the other set of rollers to the other outer disc surface.

The two outer discs rotate together in one direction and the centre disc rotates in the opposite direction.

This type of transmission unit will be referred to hereinafter as a "parallel double-ended transmission unit," since the two pairs of opposed disc surfaces and their respective sets of rollers provide two transmission paths which are effectively in parallel.

In addition to oscillatory motions of the second character on the part of individual rollers of the same set there is the possibility, in a parallel double-ended transmission unit, of oscillatory motions of the second character on the part of one set of rollers as a whole, independently of the other set of rollers.

To avoid this it is desirable to provide, as between the two sets of rollers, damping means analogous to that previously described for damping oscillatory motions as between the individual rollers of a single set of rollers. This inter-set damping may be provided by duplicating the dashpot arrangements for one roller at least, of each set and interconnecting these dashpots; leading dashpot of the chosen roller of one set to trailing dashpot of the chosen roller of the other set.

FIG. 5 illustrates the duplicated dashpot arrangement in relation to roller 1 of FIG. 2 where the arrangement of FIG. 2 forms one half of a parallel double-ended transmission unit.

Where appropriate, the same reference numerals as have been used in FIGS. 1 and 2 are again used to denote corresponding items.

The rollers and associated items of the added roller set are given the same numbers as corresponding rollers and items illustrated in FIG. 2, but the numbers are primed.

Alongside dashpot 23, and spaced from it along the direction of the main axis, is a duplicate dashpot of which the piston 53 is seen sectioned in FIG. 3. This dashpot is a leading dashpot and is paired with a similarly duplicated trailing dashpot 54 alongside a dashpot 22' (corresponding to dashpot 22), associated with roller 1' of the right-hand set of rollers.

The duct interconnecting these two dashpots must pass inwardly towards the main axis from dashpot 53 and thence via a drilling in a sleeve passing through the centre of centre disc 5 to a central support member 26' corresponding to support member 26. This is rendered necessary in the design of parallel double ended transmission unit generally favoured, because to avoid the necessity of a counter shaft and gearing to connect the drive to or from centre disc, a drum is provided which surrounds the other centre disc and is connected by its rim to the outer edge of centre disc 5. Beyond the other outer disc 4' this drum is connected to a shaft concentric with the main axis and leading out of the transmission unit casing. Such a drum is partly indicated in FIG. 3 and designated 55; it precludes direct access between the outer casing and member 26' for supporting the latter, which therefore has to be supported indirectly from member 26 by means of the said sleeve. The sleeve is shown in part in FIG. 3 and designated 56. Sleeve 56 may act as the inner race of a roller bearing 57 for centre disc 5.

At some point in the ducting between dashpots 53 and 54 a non-return valve (not shown), is interconnected for the supply of oil to the pair of dashpots.

Another pair of dashpots is provided with a leading dashpot of the right-hand set of rollers, paired with a trailing dashpot of the left-hand set of rollers. It is of little importance that the leading and trailing dashpots of either of the roller sets should be associated with the same roller of the set. For fullest possible damping however it is preferable for each roller of each set to have a duplicated leading dashpot and a duplicated trailing dashpot with six interconnections passing through sleeve 56 between paired dashpots of the two roller sets.

In certain designs space limitations render it extremely difficult to accommodate duplicate dashpots for each end of each roller and this duplication of dashpots may be avoided in the manner illustrated in FIG. 4.

The philosophy underlying this approach to the problem is to treat each roller of a parallel double-ended transmission unit as an independent entity subjected to a torque reaction and supported against that torque reaction by a fluid pressure operated actuator supplied with fluid at a pressure which is common to all the rollers. In other words, where there are two roller sets of three rollers each, the rollers are treated as if they were six rollers of a single set interconnecting one pair of toroidal surfaces only.

Such a set of six rollers, with dashpot arrangements as shown in FIG. 1 could have the dashpots at adjacent ends of adjacent rollers interconnected in pairs, extending around the array of six rollers as they extend around the array of these rollers as seen in FIG. 1.

In FIG. 4 the left-hand set of rollers and their associated dashpots are given the same reference numerals as are used for corresponding items in FIG. 1 and the same numerals, primed, are used to designate the corresponding items for the right-hand set of rollers.

The leading dashpot of roller 1, instead of being paired with trailing dashpot 36 or roller 2, is paired with trailing dashpot 36' of roller 2' of the other set of rollers. The leading dashpot 41' of roller 2' is paired with trailing dashpot 43 of roller 3, whose leading dashpot 39 is paired with trailing dashpot 24' of roller 1', whose leading dashpot 23' is paired with trailing dashpot 36 of roller 2, whose leading dashpot 41 is paired with trailing dashpot 43' of roller 3', whose leading dashpot 39' is paired with dashpot 24 of roller 1, thus completing the sequence of dashpot interconnections back and forth between the two sets of rollers.

Each interconnection between two dashpots communicates via a non-return valve with a lubrication duct 58 supplied with fluid under pressure by a pump 59.

Reference numerals, plain and primed, have been allotted to the interdashpot ducts at the leading ends of rollers 1 and 1' and the trailing ends of rollers 2 and 2'. Likewise the two associated non-return valve chambers are designated 47 and 47'. FIG. 4 may thus be readily compared with FIG. 1 and the description relating thereto.

The arrangement shown in FIG. 4 is probably the most fully balanced system for interconnecting the dashpots as between the two sets of rollers, in the case where there is only one leading and one trailing dashpot for each roller. It does have the disadvantage, however, of requiring six dashpot interconnections passing through sleeve 56, which must be kept separate and relatively leak proof, in addition to two roller positioning actuator feed ducts, and a lubricant supply duct.

An arrangement requiring only two dashpot interconnections as between the two sets of rollers is shown in FIG. 5 which is self explanatory. Here each set of rollers has its dashpots interconnected as shown in FIG. 1 except at one point in each set. At this point the dashpots are interconnected across the two roller sets. The sequence of roller interconnections runs as follows: roller 1, leading—roller 2, trailing—roller 2, leading—roller 3, trailing—*roller 3, leading—roller 1', trailing—*roller 1', leading—roller 2', trailing—roller 2', leading—roller 3', trailing—*roller 3', leading—roller 1, trailing*. The crossover points, as between the two sets of rollers, are emphasized by the italic.

The duct 60 is the normal lubricant supply duct for the right hand set of rollers and disc surfaces from which dashpot pairs 23', 36' and 41', 43' are tapped through their associated no-return valves.

Ducts 61 and 62 are the only ducts interconnecting dashpots and additional to the normal compliment of transfer ducts, which need be provided.

It should be explained the FIGS. 4 and 5 are purely diagrammatic, the rollers, their carriers and associated support mechanisms, including the roller positioning actuators, being represented by the elongated rectangles, whilst the associated dashpots are indicated by simple piston/cylinder representations.

The invention has been described in a form in which single acting dashpots are used which are kept "topped-up" through non-return valves and which are inactive as dashpots when the combined volume of a pair of dashpots is increased. This is considered to be desirable to avoid the risk of sucking in air which is a possibility when double-acting dashpots are used. It is nevertheless within the scope of the invention to use double-acting dashpots. One arrangement of this type involves the supply of fluid to a pair of dashpots via a restricted passage from a source of pressurised fluid. When the combined volume of a dashpot pair increases, fluid is drawn in from the source via the restricted passage and expelled through that passage (against the pressure of the source) when the combined volume decreases.

Precautions must be taken against the drawing-in of air through the piston seals of the dashpots, and it may be preferable to use a diaphragm in place of a sliding piston, for the movable member of each dashpot.

I claim:

1. A transmission unit of the type in which rollers provide a driving connection between facing toroidal surfaces of two discs mounted for rotation about a common main axis, namely an input disc and an output disc and in which the rollers are mounted with freedom of movement of a first character permitting the diameters of the discs, with which the rollers make driving contact, to be varied so as to vary the transmission ratio of the transmission unit and with freedom of motion also of a second character whereby the rotational axes of the rollers depart from the stable equilibrium attitude where the said roller axes intersect the main axis, so that the rollers steer themselves from one ratio attitude to another ratio attitude and with viscous damping means comprising a first element coupled to one roller and a second element coupled to another roller, the first element and the second element cooperating to define boundaries of a fluid-filled space and to change the volume of that space when the roller coupled to the first element executes a motion of the second character in the absence of a motion of the second character, in the same sense and to the same degree, on the part of the roller coupled to the second element but to leave the volume of the fluid-filled space unaltered when both of the said rollers execute motions of the second character which are the same in sense and degree, the fluid-filled space being provided with a restrictor orifice through which fluid is forced at least when the fluid-filled space is reduced in volume.

2. A transmission unit as claimed in claim 1 in which each roller has, coupled to it, a first damping means element, cooperating with a second damping means element for, and coupled to, another roller, to form boundaries of said fluid-filled space, all the rollers being coupled to damping means in this way in pairs.

3. A transmission unit as claimed in claim 2 in which each roller forms a member of two pairs.

4. A transmission unit as claimed in claim 2 in which two sets of rollers provide driving connections between two pairs of facing toroidal surfaces one surface of one pair being coupled to rotate with one surface of the other pair and the other surfaces of both pairs being coupled to rotate together whereby the two sets of rollers provide parallel driving paths and in which one roller of one set has, coupled to it, a first damping means element, cooperating with a second damping means element for, and coupled to, a roller of the other set, to form boundaries of the said fluid-filled space whereby the two rollers form a pair.

5. A transmission unit as claimed in claim 4 in which each roller of one set of rollers has, coupled to it a first damping means element, cooperating with a second damping means element for, and coupled to, at least one roller of the other set of rollers whereby the two rollers, so coupled, form a pair.

6. A transmission unit as claimed in claim 4, in which each roller is a member of two pairs, two only of such pairs comprising rollers from different sets, of the two sets of rollers.

7. A transmission unit as claimed in claim 1 in which leading dashpot means are provided for a roller, adapted to reduce the capacity of a fluid-filled chamber when the roller executes a motion of the second character of a sense such as to initiate a change of ratio towards a lower ratio and trailing dashpot means are provided for another roller, adapted to reduce the capacity of a fluid-filled chamber when that other roller executes a motion of the second character of a sense such as to initiate a change of ratio towards a higher ratio, an interconnection between the chambers and at least one restrictive passage through which fluid is caused to flow when one of the chambers is reduced in capacity without a simultaneous corresponding increase in capacity on the part of the other chamber.

8. A transmission unit as claimed in claim 7 in which a pair of interconnected chambers is furnished with a supply of fluid under low pressure entering through a one-way valve, oriented to close against a flow of fluid from the interconnected chambers through the valve, such fluid escaping through the restrictive passage.

9. A transmission unit as claimed in claim 7 in which there are provided a leading dashpot and a trailing dashpot for each roller, the leading dashpot of one roller being connected to the trailing dashpot of another roller in pairs so that when one dashpot pair is increasing its total chamber capacity and being replenished with fluid through the associated one-way valve another dashpot pair is reducing its total capacity and supplying damping by forcing fluid to flow through the associated restrictive passage.

10. A transmission unit as claimed in claim 9 in which two sets of rollers provide driving connections between two pairs of facing toroidal surfaces one surface of one pair being coupled to rotate with one surface of the other pair and the other surfaces of both pairs being coupled to rotate together so that the two sets of rollers provide parallel driving paths in which the leading dashpot associated with at least one roller of one set is paired with the trailing dashpot associated with a roller of the other set.

References Cited

UNITED STATES PATENTS

| | | | |
|---|---|---|---|
| 3,008,337 | 11/1961 | Kraus | 74—200 |
| 3,030,817 | 4/1962 | Tomaszek et al. | 74—200 |
| 3,048,047 | 8/1962 | Richardson | 74—200 |
| 3,087,348 | 4/1963 | Kraus | 74—200 |
| 3,142,189 | 7/1964 | Davis et al. | 74—200 |
| 3,142,190 | 7/1964 | Kelsey et al. | 74—200 |
| 3,159,042 | 12/1964 | Kraus | 74—200 |
| 3,163,051 | 12/1964 | Kraus | 74—200 |
| 3,267,756 | 8/1966 | Perry et al. | 74—200 |

DONLEY J. STOCKING, *Primary Examiner*.

DAVID J. WILLIAMOWSKY, *Examiner*.

L. H. GERIN, *Assistant Examiner*.